(12) United States Patent
Tanaka

(10) Patent No.: US 12,545,258 B2
(45) Date of Patent: Feb. 10, 2026

(54) VEHICLE CONTROLLER, METHOD, AND COMPUTER PROGRAM FOR VEHICLE CONTROL

(71) Applicant: Woven by Toyota, Inc., Tokyo (JP)

(72) Inventor: Masahiro Tanaka, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 114 days.

(21) Appl. No.: 18/614,852

(22) Filed: Mar. 25, 2024

(65) Prior Publication Data

US 2024/0383478 A1 Nov. 21, 2024

(30) Foreign Application Priority Data

May 15, 2023 (JP) .................................. 2023-079890

(51) Int. Cl.
*B60W 30/18* (2012.01)
*B60W 60/00* (2020.01)

(52) U.S. Cl.
CPC .............. *B60W 30/18163* (2013.01); *B60W 30/18159* (2020.02); *B60W 60/0011* (2020.02); *B60W 60/0015* (2020.02); *B60W 2552/53* (2020.02); *B60W 2556/10* (2020.02)

(58) Field of Classification Search
CPC ..... B60W 30/18159; B60W 30/18163; B60W 60/0011; B60W 60/0015; B60W 60/0016; B60W 2556/10; B60W 2556/50; B60W 2556/55
USPC ........................................................... 701/41
See application file for complete search history.

(56) References Cited

U.S. PATENT DOCUMENTS

| 11,126,185 | B2 * | 9/2021 | McGill, Jr. .......... G05D 1/0257 |
| 2020/0086861 | A1 * | 3/2020 | McGill, Jr. .......... G05D 1/0214 |
| 2020/0125106 | A1 * | 4/2020 | Russell ................ G05D 1/0221 |
| 2021/0139048 | A1 * | 5/2021 | Russell ................. G08G 1/166 |
| 2024/0067207 | A1 * | 2/2024 | Chen .................. G01C 21/3822 |
| 2024/0409090 | A1 * | 12/2024 | Abroshan .......... B60W 60/0011 |

FOREIGN PATENT DOCUMENTS

| EP | 3798782 A1 * | 3/2021 | ............ B60W 50/00 |
| JP | 2015-75423 A | 4/2015 | |
| JP | 2018-022353 A | 2/2018 | |
| JP | 2020-126505 A | 8/2020 | |
| WO | 2020/081352 A1 | 4/2020 | |

\* cited by examiner

*Primary Examiner* — Erick R Solis
(74) *Attorney, Agent, or Firm* — Sughrue Mion, PLLC

(57) ABSTRACT

A vehicle controller includes a memory configured to store trajectory distribution information representing distribution of trajectories for each lane in a predetermined section of a road; and a processor configured to set a target trajectory of a vehicle by referring to the trajectory distribution information of a second lane different from a first lane being traveled by the vehicle, when the vehicle travels the predetermined section, and make the vehicle travel along the target trajectory.

9 Claims, 8 Drawing Sheets

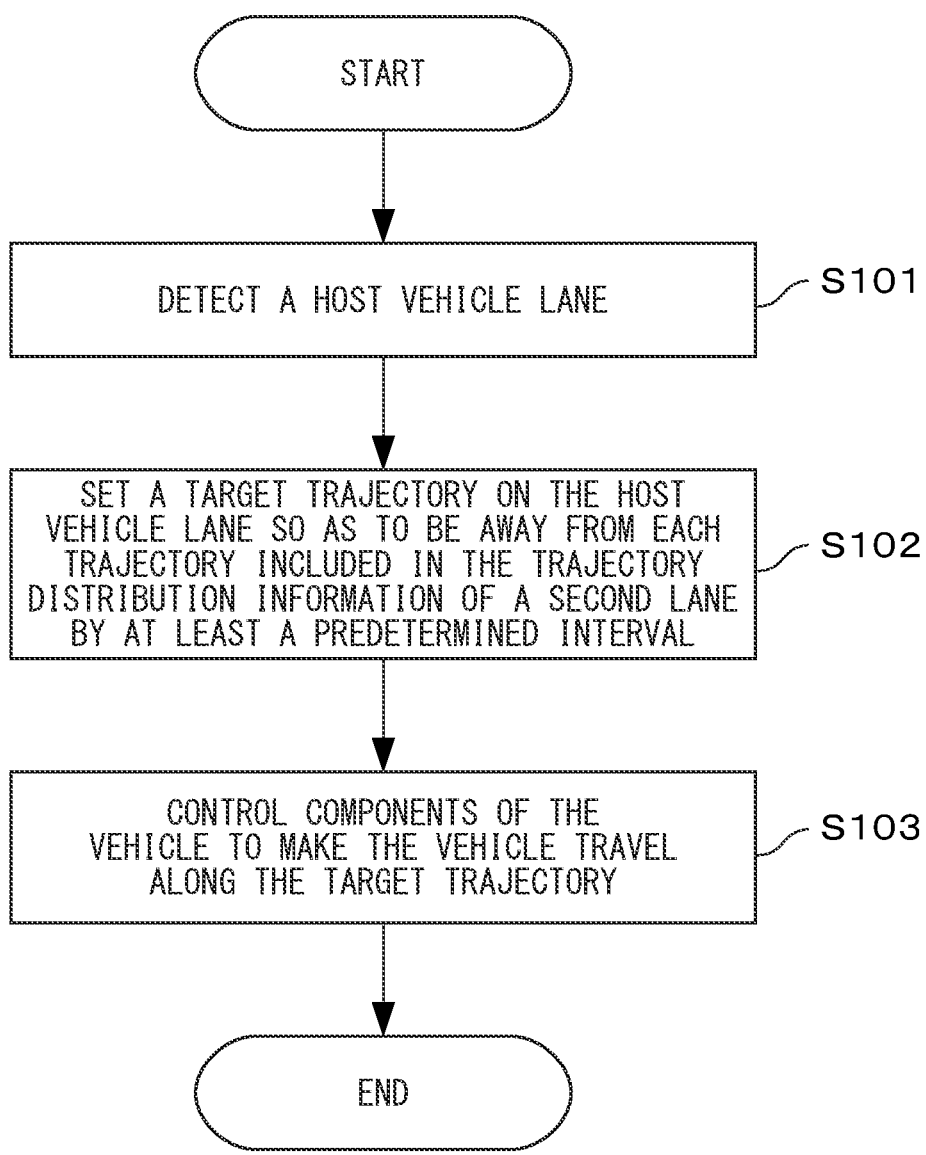

VEHICLE CONTROLLER, METHOD, AND COMPUTER PROGRAM FOR VEHICLE CONTROL

FIELD

The present invention relates to a vehicle controller, a method, and a computer program for vehicle control.

BACKGROUND

A technique has been proposed in which a system configured to execute autonomous driving control of a vehicle records an actual trajectory of the vehicle during manual driving and makes the vehicle travel by referring to the recorded trajectory during autonomous driving (see Japanese Unexamined Patent Publication JP2018-22353A).

A vehicle travel controller disclosed in JP2018-22353A generates a trajectory of a host vehicle from history of positions of the host vehicle during manual driving, and sets the generated trajectory as a target trajectory of the host vehicle.

SUMMARY

However, a vehicle under manual driving control does not always travel along an ideal trajectory. Depending on road sections, a vehicle may travel along a trajectory deviating from a lane being traveled, or trajectories may vary from vehicle to vehicle. For this reason, even if a trajectory to be traveled (hereafter simply a "target trajectory") is set based on a trajectory of a vehicle under manual driving control, the set target trajectory may not be a safe trajectory.

It is an object of the present invention to provide a vehicle controller that can set a very safe target trajectory.

According to an embodiment, a vehicle controller is provided. The vehicle controller includes a memory configured to store trajectory distribution information representing distribution of trajectories for each lane in a predetermined section of a road; and a processor configured to set a target trajectory of a vehicle by referring to the trajectory distribution information of a second lane different from a first lane being traveled by the vehicle, when the vehicle travels the predetermined section, and make the vehicle travel along the target trajectory.

The trajectory distribution information preferably includes, for each lane in the predetermined section, a plurality of trajectories of the lane, and the processor of the vehicle controller preferably sets the target trajectory away from any of the plurality of trajectories of the second lane included in the trajectory distribution information by at least a predetermined interval.

Alternatively, the trajectory distribution information preferably includes a reference trajectory and a variation index indicating how much trajectories vary, and the processor of the vehicle controller preferably sets the target trajectory farther from the reference trajectory of the second lane as the variation index of the second lane included in the trajectory distribution information is greater.

In this case, the processor preferably identifies a lane having the lowest variation index in the predetermined section by referring to the trajectory distribution information, and sets a target trajectory from a current position of the vehicle to the predetermined section so that the vehicle moves to the identified lane before reaching the predetermined section.

According to another embodiment, a vehicle controller is provided. The vehicle controller includes a memory configured to store a reference trajectory for each lane in a predetermined section of a road; and a processor configured to select a lane whose reference trajectory is the safest of the reference trajectories of lanes in a travel direction of the vehicle, when the vehicle travels the predetermined section, and make the vehicle travel along the reference trajectory of the selected lane.

The processor of the vehicle controller preferably determines that a reference trajectory whose lane position is the same at an entry into the predetermined section and an exit from the predetermined section is safer than a reference trajectory whose lane position is different at an entry into the predetermined section and an exit from the predetermined section, among the reference trajectories of lanes in a travel direction of the vehicle.

The processor of the vehicle controller is preferably further configured to detect a host vehicle lane being traveled by the vehicle. When the host vehicle lane differs from the selected lane, the processor preferably controls the vehicle so that the vehicle moves to the selected lane before reaching the predetermined section.

According to still another embodiment, a method for vehicle control is provided. The method includes setting a target trajectory of a vehicle by referring to trajectory distribution information of a second lane different from a first lane being traveled by the vehicle, when the vehicle travels a predetermined section of a road; and making the vehicle travel along the target trajectory. The trajectory distribution information represents distribution of trajectories for each lane in the predetermined section.

According to yet another embodiment, a non-transitory recording medium that stores a computer program for vehicle control is provided. The computer program includes instructions causing a processor mounted on a vehicle to execute a process including setting a target trajectory of the vehicle by referring to trajectory distribution information of a second lane different from a first lane being traveled by the vehicle, when the vehicle travels a predetermined section of a road; and making the vehicle travel along the target trajectory. The trajectory distribution information represents distribution of trajectories for each lane in the predetermined section.

The vehicle controller according to the present disclosure has an advantageous effect of being able to set a very safe target trajectory.

BRIEF DESCRIPTION OF DRAWINGS

FIG. 5 is an operation flowchart of the vehicle control process according to the first embodiment.

DESCRIPTION OF EMBODIMENTS

A vehicle controller, a method for vehicle control executed by the vehicle controller, and a computer program for vehicle control will now be described with reference to the attached drawings. The vehicle controller uses trajectory distribution information, which represents, for each lane, the distribution of trajectories along which various vehicles have actually traveled through a predetermined section of a road, for setting a target trajectory of a vehicle. The distribution of trajectories may include a non-ideal trajectory for various reasons. By setting a target trajectory in this way, the vehicle controller can execute autonomous driving control of a vehicle, taking account of information on a non-ideal trajectory, in order to make the vehicle travel more safely. Alternatively, the vehicle controller selects a lane whose reference trajectory is the safest by referring to reference trajectories of respective lanes, and makes the vehicle travel along the reference trajectory of the selected lane.

Figure 1:
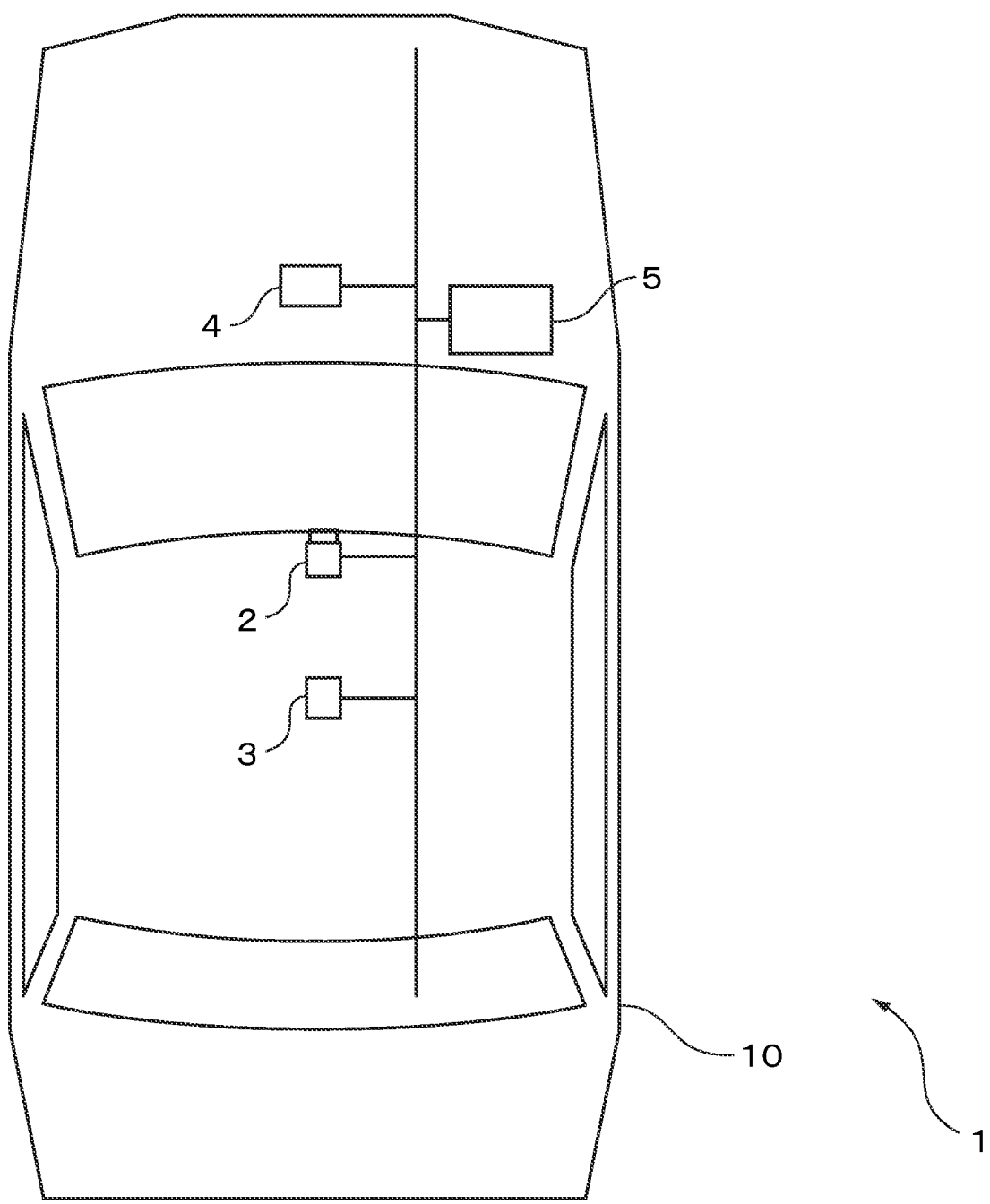
FIG. 1 schematically illustrates the configuration of a vehicle control system equipped with a vehicle controller.
Figure 2:
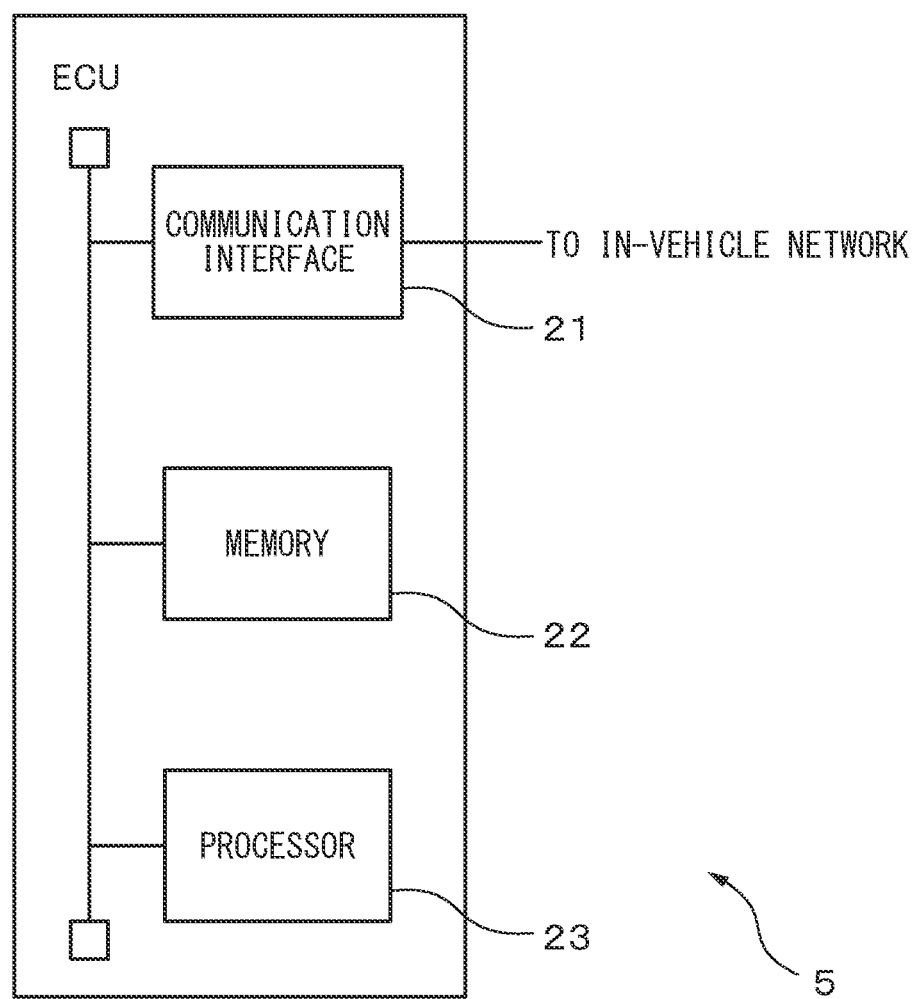
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a camera 2, a GPS receiver 3, a storage device 4, and an electronic control unit (ECU) 5, which is an example of the vehicle controller. The camera 2, the GPS receiver 3, and the storage device 4 are communicably connected to the ECU 5 via an in-vehicle network conforming to a standard such as a controller area network. The vehicle control system 1 may further include a range sensor (not illustrated) that measures the distances from the vehicle 10 to objects around the vehicle 10, such as LiDAR or radar; a wireless communication terminal (not illustrated) for wireless communication with a device outside the vehicle 10; and a navigation device (not illustrated) for searching for a planned travel route to a destination.

The camera 2, which is an example of a sensor configured to generate a sensor signal representing the surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 takes a picture of a region in front of the vehicle 10 every predetermined capturing period (e.g., 1/30 to 1/10 seconds), and generates images representing the region. Each image obtained by the camera 2 is an example of a sensor signal. The vehicle 10 may include multiple cameras taking pictures in different orientations or having different focal lengths.

Every time an image is generated, the camera 2 outputs the generated image to the ECU 5 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the ECU 5 via the in-vehicle network at predetermined intervals. Instead of the GPS receiver, the vehicle 10 may include a receiver that receives positioning signals from satellites of another satellite positioning system to determine the position of the vehicle 10.

The storage device 4, which is an example of the storage unit, includes, for example, a hard disk drive, a nonvolatile semiconductor memory, or an optical medium and an access device therefor. The storage device 4 stores a high-precision map used for autonomous driving control of the vehicle 10. The high-precision map includes, for example, information indicating road markings, such as lane lines or stop lines, and the number of lanes for each road section included in a predetermined region represented in the high-precision map. For each road section, the high-precision map further includes information for determining whether the road section corresponds to a predetermined section, such as the curvature of the road section and the presence or absence of an intersection, a merge point, a divergent point, or a location of a way in and out of vehicles. The high-precision map further includes trajectory distribution information of a predetermined section for each lane of the road section. The trajectory distribution information includes information representing a plurality of trajectories for each lane. The trajectory distribution information may further include information representing a reference trajectory and a variation index indicating how much trajectories vary, for each lane.

The reference trajectory of an individual lane is a standard trajectory along which vehicles travel the lane unless there is a special reason. For example, the reference trajectory is set by averaging a plurality of trajectories of vehicles that have actually traveled through the lane. Alternatively, the reference trajectory may be set along the center of the lane. The variation index may be a variance value of a plurality of trajectories in a single lane regarding the width direction of the lane. Alternatively, the variation index may be the maximum of the differences in position in the width direction of the lane between the plurality of trajectories or the distance in the width direction of the lane between the reference trajectory and a trajectory farthest from the reference trajectory of the plurality of trajectories.

In some cases, the vehicle 10 that enters a predetermined section from one side can select one of multiple exits from the predetermined section, as in the case where the predetermined section includes an intersection. In such cases, a reference trajectory and a variation index are set for each exit. For example, assume that the predetermined section includes a crossroads, and that at one end of the predetermined section, there are a lane where going straight and turning left are permitted, a lane where only going straight is permitted, and a lane where going straight and turning right are permitted. In this case, for the lane where going straight and turning left are permitted, the high-precision map includes information representing a reference trajectory for vehicles going straight, information representing a reference trajectory for vehicles turning left, and variation indices corresponding thereto. For the lane where only going straight is permitted, the high-precision map includes information representing a reference trajectory for vehicles going straight and a variation index. For the lane where going straight and turning right are permitted, the high-precision map includes information representing a reference trajectory for vehicles going straight, information representing a reference trajectory for vehicles turning right, and variation indices corresponding thereto. Similarly, when the predetermined section includes a divergent point, the high-precision map includes, for each lane, information representing reference trajectories and variation indices for respective travelable directions at the divergent point.

The storage device 4 may further include a processor for executing, for example, a process to update the high-precision map and a process related to a request from the ECU 5 to read out the high-precision map. For example, every time the vehicle 10 moves a predetermined distance, the storage device 4 may transmit a request to obtain a high-precision map, together with the current position of the vehicle 10, to a map server (not illustrated) via a wireless communication terminal (not illustrated). The storage device 4 may receive a high-precision map of a predetermined region around the current position of the vehicle 10 from the map server via the wireless communication terminal. When a request from the ECU 5 to read out the high-precision map is received, the storage device 4 cuts out that portion of the high-precision map stored therein which includes the current position of the vehicle 10 and which represents a region smaller than the predetermined region, and outputs the cutout portion to the ECU 5 via the in-vehicle network.

The ECU 5 executes autonomous driving control of the vehicle 10. In the present embodiment, the ECU 5 sets a target trajectory by referring to the trajectory distribution information of a predetermined section in the travel direction of the vehicle 10, and makes the vehicle 10 travel along the set target trajectory.

As illustrated in FIG. 2, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. Every time an image is received from the camera 2, the communication interface 21 passes the received image to the processor 23. Every time positioning information is received from the GPS receiver 3, the communication interface 21 passes the positioning information to the processor 23. In addition, the communication interface 21 passes the high-precision map read from the storage device 4 to the processor 23.

The memory 22, which is another example of the storage unit, includes, for example, volatile and nonvolatile semiconductor memories, and stores various types of data used in a vehicle control process executed by the processor 23. For example, the memory 22 stores parameters of the camera 2 including the focal length, the orientation, and the mounted position of the camera 2 as well as various parameters for specifying an object-detecting classifier used for detecting, for example, features. The memory 22 further stores positioning information of the vehicle 10, images of the surroundings of the vehicle 10, and a high-precision map. Further, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

First Embodiment

Hereafter, a vehicle control process according to a first embodiment will be described. In the vehicle control process according to the first embodiment, the processor 23 sets a target trajectory by referring to the trajectory distribution information of another lane different from a host vehicle lane being traveled by the vehicle 10 (the host vehicle lane may be referred to as a "first lane" below, and the other lane will be referred to as a "second lane" below). More specifically, the processor 23 sets a target trajectory away from the second lane, based on the trajectory distribution information of the second lane, when another vehicle traveling on the second lane is assumed to approach or intrude into the host vehicle lane.

Figure 3:
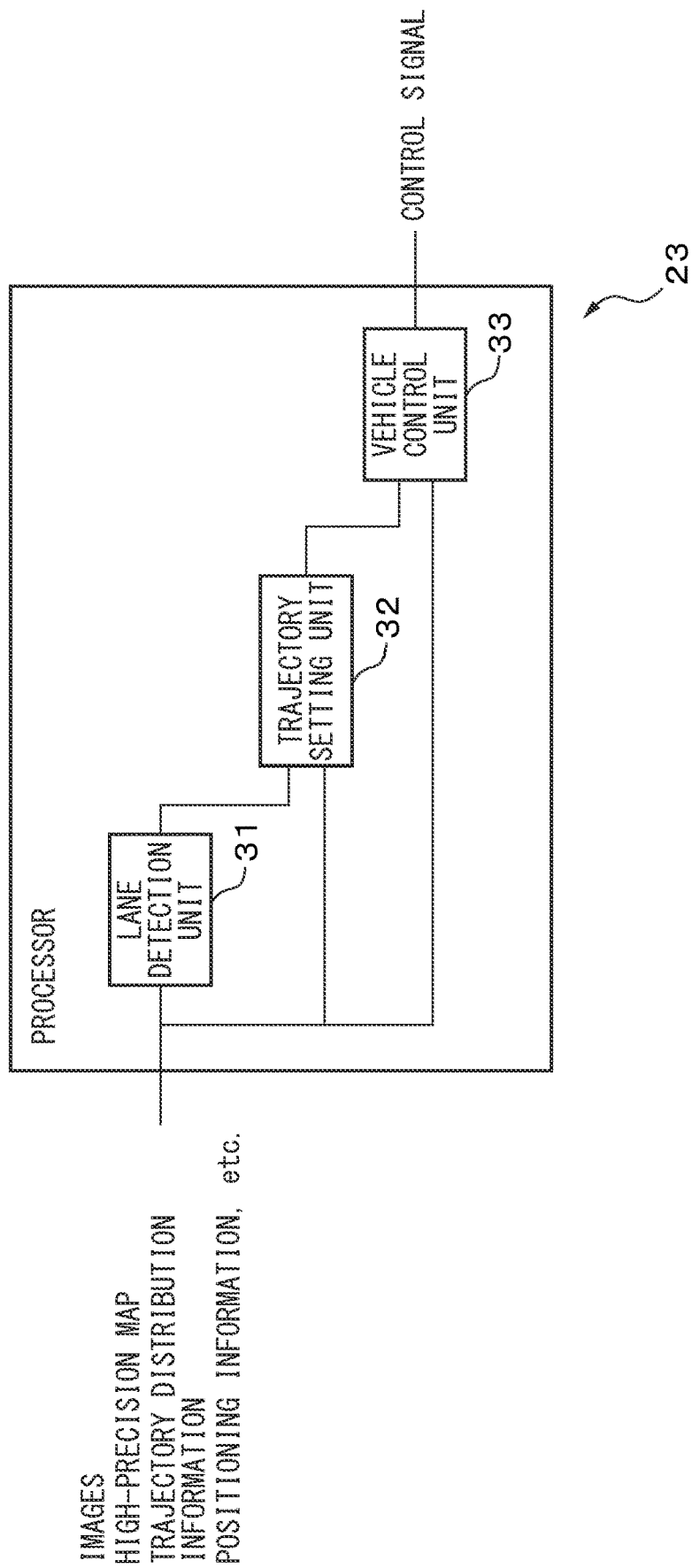
FIG. 3 is a functional block diagram of a processor of the electronic control unit, related to a vehicle control process according to a first embodiment.

FIG. 3 is a functional block diagram of the processor 23, related to the vehicle control process according to the first embodiment. The processor 23 includes a lane detection unit 31, a trajectory setting unit 32, and a vehicle control unit 33. These units included in the processor 23 are functional modules, for example, implemented by a computer program executed by the processor 23, or may be dedicated operating circuits provided in the processor 23.

The lane detection unit 31 detects a host vehicle lane by comparing an image generated by the camera 2 and representing the surroundings of the vehicle 10 (hereafter simply an "image") with the high-precision map. For example, assuming the position and orientation of the vehicle 10, the lane detection unit 31 projects features on or around the road detected from an image onto the high-precision map or features on or around the road in the vicinity of the vehicle 10 represented in the high-precision map onto the image. The features on or around the road may be, for example, road markings, such as lane lines or stop lines, or curbstones. The lane detection unit 31 estimates the position of the vehicle 10 to be the position and orientation of the vehicle 10 for the case where the features detected from the image match those represented in the high-precision map the best.

The lane detection unit 31 uses initial values of the assumed position and orientation of the vehicle 10 and parameters of the camera 2, such as the focal length, the height of the mounted position, and the orientation, to determine the positions in the high-precision map or the image to which the features are projected. As the initial values of the position and orientation of the vehicle 10 is used the position of the vehicle 10 determined by the GPS receiver 3 or a position obtained by correcting, with odometry information, the position and orientation of the vehicle 10 estimated at the last detection of the host vehicle lane. The lane detection unit 31 then calculates the degree of matching between the features on or around the road detected from the image and the corresponding features represented in the high-precision map (e.g., the inverse of the sum of squares of the distances between these features).

The lane detection unit 31 repeats the above-described processing while varying the assumed position and orientation of the vehicle 10. The lane detection unit 31 estimates the actual position of the vehicle 10 to be the position and orientation for the case where the degree of matching is a maximum. The lane detection unit 31 then identifies a lane including the position of the vehicle 10 as the host vehicle lane being traveled by the vehicle 10, by referring to the high-precision map.

For example, the lane detection unit 31 inputs an image into a classifier that has been trained to detect detection target features from an image, thereby detecting these features. As such a classifier, the lane detection unit 31 can use, for example, a deep neural network (DNN) having architecture of a convolutional neural network (CNN) type, such as Single Shot MultiBox Detector or Faster R-CNN. Alternatively, as such a classifier, the lane detection unit 31 may use a DNN having architecture of a self-attention network (SAN) type, such as Vision Transformer.

The lane detection unit 31 notifies information indicating the detected host vehicle lane to the trajectory setting unit 32.

The trajectory setting unit 32 sets a target trajectory by referring to the trajectory distribution information of a predetermined section lying between the current position of the vehicle 10 and a location that is a predetermined distance (e.g., several hundred meters to several kilometers) away in the travel direction of the vehicle 10.

The predetermined section may be, for example, a curved section whose curvature is not less than a predetermined degree or a road section including an intersection. Alternatively, the predetermined section may be a road section including a point of merge with another road or a road section fronted by a way in and out of vehicles, such as an entrance and exit of a parking lot. The predetermined section is not limited to these road sections, and may be a simple straight road section. Alternatively, the predetermined section may be a road section that has trajectory distribution information in the high-precision map.

The trajectory setting unit 32 identifies a predetermined section lying between the current position of the vehicle 10 and a location that is a predetermined distance away along the travel direction of the vehicle 10 by referring to the high-precision map. Of the trajectory distribution information of the predetermined section included in the high-precision map, the trajectory setting unit 32 refers to trajectory distribution information of a second lane other than the host vehicle lane, in particular, a lane adjacent to the host vehicle lane. The adjacent lane is not limited to a parallel lane along which other vehicles can travel in the same direction as the vehicle 10, and may be an opposite lane. The trajectory setting unit 32 sets a target trajectory away from any of the plurality of trajectories on the second lane included in the trajectory distribution information by at least a predetermined interval. The trajectory setting unit 32 sets the target trajectory so as to minimize the amount of deviation from the center of the host vehicle lane or the reference trajectory as long as the target trajectory is away from any of the plurality of trajectories on the second lane by at least a predetermined interval.

When the trajectory distribution information of the second lane includes an abnormal trajectory approaching or intruding into the host vehicle lane, it is supposed that a vehicle traveling on the second lane may approach or intrude into the host vehicle lane. The vehicle 10 can maintain a certain distance from such a vehicle by setting a target trajectory as described above.

Figure 4A:
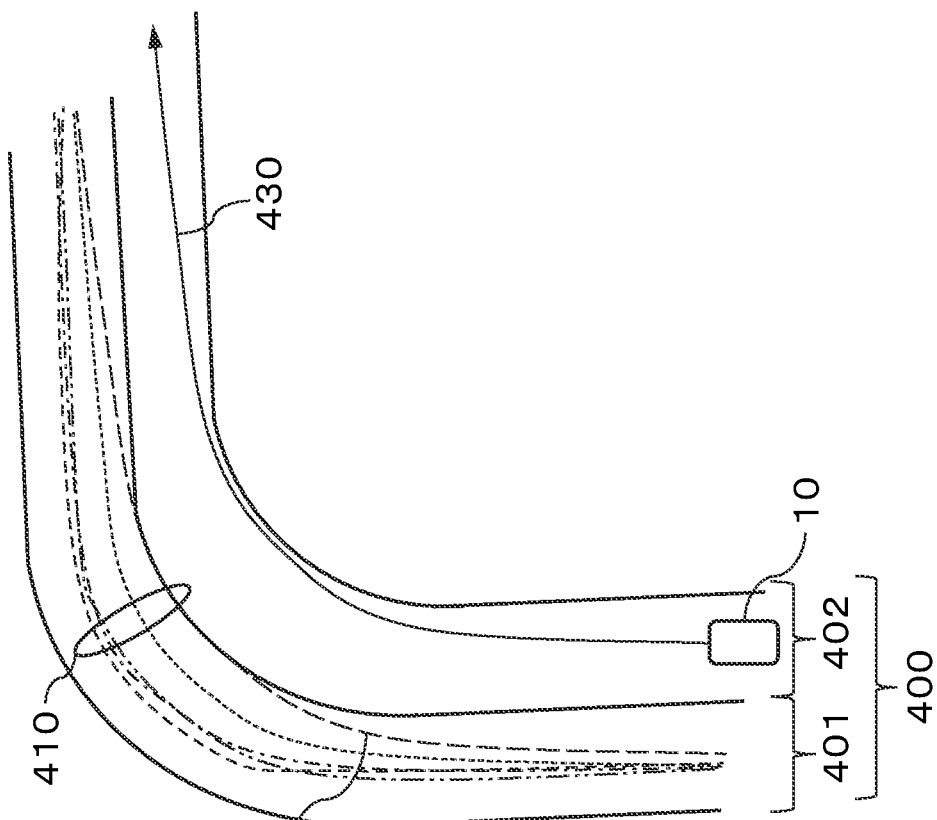
FIG. 4A illustrates an example of the relationship between the distribution of trajectories in an adjacent lane and a target trajectory.
Figure 4B:
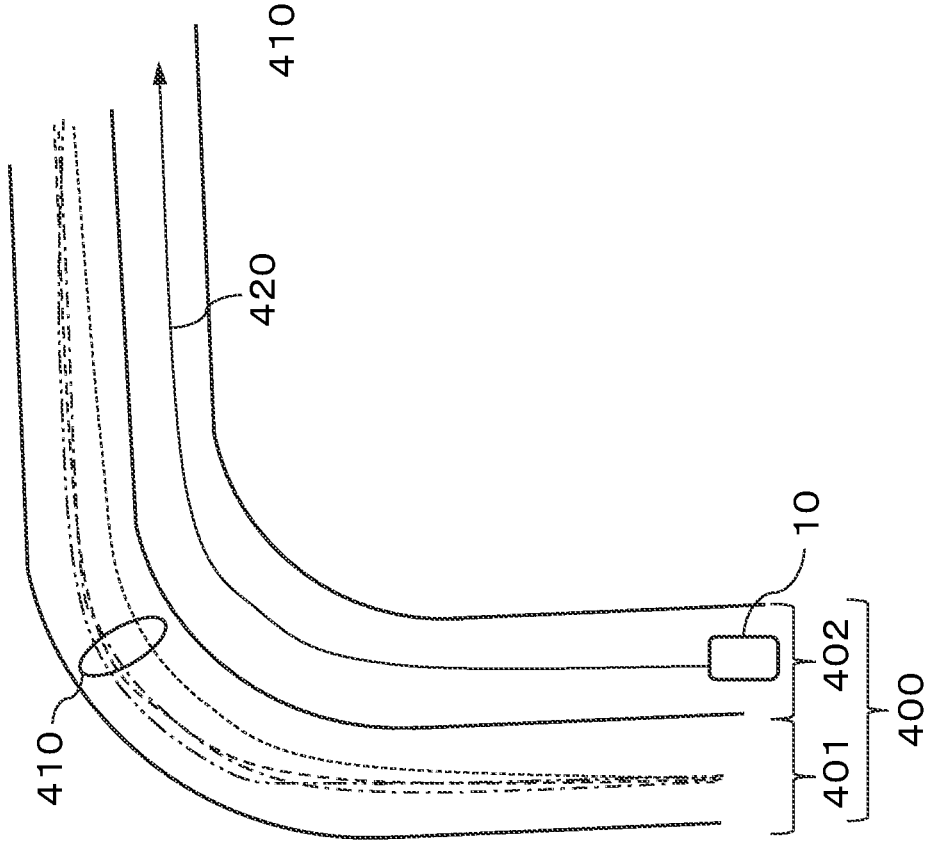
FIG. 4B illustrates another example of the relationship between the distribution of trajectories in an adjacent lane and a target trajectory.

FIGS. 4A and 4B illustrate examples of the relationship between the distribution of trajectories in an adjacent lane and a target trajectory. In the examples illustrated in FIGS. 4A and 4B, the vehicle 10 is traveling on a right lane 402 of two lanes 401 and 402 of a road 400. In other words, the lane 402 is a host vehicle lane. Thus, to set a target trajectory, trajectory distribution information of the left lane 401 is referred to.

In the example illustrated in FIG. 4A, variations of a plurality of trajectories 410 included in the trajectory distribution information of the lane 401 are relatively small, and any trajectory is near the center of the lane 401. Thus, a target trajectory 420, which is set away from each trajectory by at least a predetermined interval, is also set near the center of the host vehicle lane 402.

In the example illustrated in FIG. 4B, a trajectory 410a of a plurality of trajectories 410 included in trajectory distribution information of the lane 401 passes through a position close to the boundary between the host vehicle lane 402 and the lane 401. Thus, a target trajectory 430 is set so as to pass through positions farther from the lane 401 than the center of the host vehicle lane 402 as the trajectory 410a is closer to the host vehicle lane 402.

As described above, the trajectory distribution information may include, for each lane, a reference trajectory of the lane and a variation index indicating how much trajectories vary. In this case, the trajectory setting unit 32 may set the target trajectory farther from the reference trajectory of the second lane as the variation index of the second lane is greater. For example, when the variation index of an adjacent lane is not greater than a predetermined variation threshold, the trajectory setting unit 32 sets the reference trajectory of the host vehicle lane as the target trajectory. When the variation index of an adjacent lane exceeds the predetermined variation threshold, the trajectory setting unit 32 sets the target trajectory so as to pass through positions shifted from the reference trajectory of the host vehicle lane in the direction away from the adjacent lane by an offset distance depending on the variation index of the adjacent lane. In this way, the target trajectory is set away from the reference trajectory of the adjacent lane having a high variation index. In this case also, the trajectory setting unit 32 can set a target trajectory such that the vehicle 10 can maintain a certain distance from another vehicle on the second lane approaching or intruding into the host vehicle lane, as in the above-described example.

In some cases, vehicles can proceed in multiple directions from the host vehicle lane and a second lane, as in the case where the predetermined section includes an intersection. In such cases, the trajectory setting unit 32 executes the above-described processing by referring to the reference trajectory and the variation index regarding the same direction as the travel direction of the vehicle 10 on the host vehicle lane (in the case of a parallel lane) or the opposite direction (in the case of an opposite lane) among the reference trajectories and the variation indices set for the second lane. The trajectory setting unit 32 identifies the direction in which the vehicle 10 proceeds in the predetermined section by referring to a planned travel route of the vehicle 10 received from the navigation device (not illustrated).

Upon setting a target trajectory, the trajectory setting unit 32 notifies the set target trajectory to the vehicle control unit 33.

The vehicle control unit 33 controls components of the vehicle 10 to make the vehicle 10 travel along the target trajectory received from the trajectory setting unit 32. To achieve this, the vehicle control unit 33 measures the position of the vehicle 10 at predetermined intervals, and compares the measured position of the vehicle 10 with the target trajectory. The vehicle control unit 33 measures the correct position of the vehicle 10 by comparing an image obtained by the camera 2 with the high-precision map, in a manner similar to that described in relation to the lane detection unit 31. When the measured position of the vehicle 10 is on the target trajectory, the vehicle control unit 33 determines the steering angle of the vehicle 10 so that the vehicle 10 proceeds along the target trajectory, and controls the steering of the vehicle 10 so that the steering angle is the same as determined. When the measured position of the vehicle 10 is away from the target trajectory, the vehicle control unit 33 determines the steering angle of the vehicle 10 so that the vehicle 10 approaches the target trajectory, and controls the steering of the vehicle 10 so that the steering angle is the same as determined.

Further, the vehicle control unit 33 sets the acceleration or deceleration of the vehicle 10 to keep the distance between the vehicle 10 and another vehicle traveling ahead (hereafter a "vehicle ahead") above a certain distance. To achieve this, the vehicle control unit 33 detects a vehicle ahead by inputting an image obtained by the camera 2 or a ranging signal obtained by a range sensor (not illustrated) into a classifier that has been trained to detect a vehicle. The vehicle control unit 33 then estimates the distance between the vehicle 10 and the vehicle ahead, based on the size of the vehicle ahead in the image or the bottom position of a region representing the vehicle ahead or based on that distance in the direction to the detected vehicle ahead which is indicated by the ranging signal. When the distance between the vehicle 10 and the vehicle ahead falls below a predetermined distance threshold, the vehicle control unit 33 sets the acceleration or deceleration of the vehicle 10 to decelerate the vehicle 10. When the distance between the vehicle 10 and the vehicle ahead is not less than the predetermined distance threshold, the vehicle control unit 33 sets the acceleration or deceleration of the vehicle 10 so that the speed of the vehicle 10 is kept constant or approaches the speed limit of a road being traveled by the vehicle 10 or a target speed set by the driver. Then the vehicle control unit 33 sets the degree of accelerator opening or the amount of braking according to the set acceleration or deceleration. The vehicle control unit 33 determines the amount of fuel injection according to the set degree of accelerator opening, and outputs a control signal depending on the amount of fuel injection to a fuel injector of an engine of the vehicle 10. Alternatively, the vehicle control unit 33 determines electric power to be supplied to a motor according to the set degree of accelerator opening, and controls a driving circuit of the motor so that the determined electric power is supplied to the motor. Alternatively, the vehicle control unit 33 outputs a control signal depending on the set amount of braking to the brake of the vehicle 10.

FIG. 5 is an operation flowchart of the vehicle control process according to the first embodiment executed by the processor 23. The processor 23 executes the vehicle control process at predetermined intervals in accordance with the operation flowchart described below.

The lane detection unit 31 of the processor 23 detects a host vehicle lane being traveled by the vehicle 10 (step S101).

The trajectory setting unit 32 of the processor 23 sets a target trajectory on the host vehicle lane in a predetermined section nearer than a location that is a predetermined distance away in the travel direction of the vehicle 10, by referring to the trajectory distribution information of a second lane other than the host vehicle lane, so as to be away from any trajectory on the second lane by at least a predetermined interval (step S102). As described above, the trajectory setting unit 32 may set the target trajectory farther from the reference trajectory of the second lane as the variation index of the second lane is greater.

The vehicle control unit 33 of the processor 23 controls components of the vehicle 10 so that the vehicle 10 travels along the target trajectory (step S103). The processor 23 then terminates the vehicle control process.

As has been described above, the vehicle controller uses the trajectory distribution information of a second lane for setting a target trajectory of the vehicle. The vehicle controller can therefore set a very safe target trajectory, taking account of a possible trajectory of another vehicle traveling on the second lane.

In a section where the trajectory distribution information indicates that trajectories on a second lane greatly vary, it is supposed that another vehicle traveling on the second lane may approach the host vehicle lane accidentally. Thus, according to a modified example, the vehicle control unit 33 may notify the driver of a warning that another vehicle may approach the vehicle 10, via a display (not illustrated) or a speaker (not illustrated) provided in the vehicle interior, in a section where the variation index of a second lane other than the host vehicle lane is not less than a predetermined threshold.

In a section where the trajectory distribution information indicates that trajectories on the host vehicle lane greatly vary, it is also supposed that some interference may occur during travel of the vehicle 10. Thus the vehicle control unit 33 may also notify the driver of a warning to draw attention to travel of the vehicle 10, via the display or the speaker provided in the vehicle interior, in a section where the variation index of the host vehicle lane is not less than the predetermined threshold.

According to another modified example, the trajectory setting unit 32 may give higher priority to a lane having a lower variation index among lanes in the travel direction of the vehicle 10 in a predetermined section to set a target trajectory. For example, the trajectory setting unit 32 identifies a lane having the lowest variation index among lanes to which the vehicle 10 can move before reaching the predetermined section. The trajectory setting unit 32 then sets a target trajectory from the current position of the vehicle 10 indicated by the latest positioning information to the predetermined section so that the vehicle 10 moves to the identified lane before reaching the predetermined section. For the predetermined section, the trajectory setting unit 32 sets a target trajectory in accordance with the above-described embodiment or modified example. The distance required for a single lane change (hereafter the "lane change distance") may be prestored in the memory 22. The trajectory setting unit 32 determines the distance from the current position of the vehicle 10 to the predetermined section by referring to the high-precision map, and determines the distance divided by the lane change distance as the maximum number of lane changes that can be made before the vehicle 10 reaches the predetermined section. The trajectory setting unit 32 determines individual lanes reachable from the host vehicle lane by at most the maximum number of lane changes as the lanes to which the vehicle 10 can move before reaching the predetermined section. According to this modified example, the trajectory setting unit 32 can set a target trajectory so that the vehicle 10 can travel while avoiding a lane where interference is likely to occur.

Second Embodiment

Next, a vehicle control process according to a second embodiment will be described. In the vehicle control process according to the second embodiment, the processor 23 selects a lane whose reference trajectory is the safest as a target lane by referring to reference trajectories of respective lanes, and makes the vehicle 10 travel along the reference trajectory of selected target lane.

The vehicle control process according to the second embodiment differs from the vehicle control process according to the first embodiment in part of processing executed by the processor 23. Thus the following describes what differs from the first embodiment.

In the second embodiment, the high-precision map includes information representing a reference trajectory for each lane in a predetermined section. The predetermined section in the second embodiment may be a road section similar to the predetermined section in the first embodiment. In the second embodiment, the predetermined section may be a road section that has information representing reference trajectories of lanes in the high-precision map.

Figure 6:
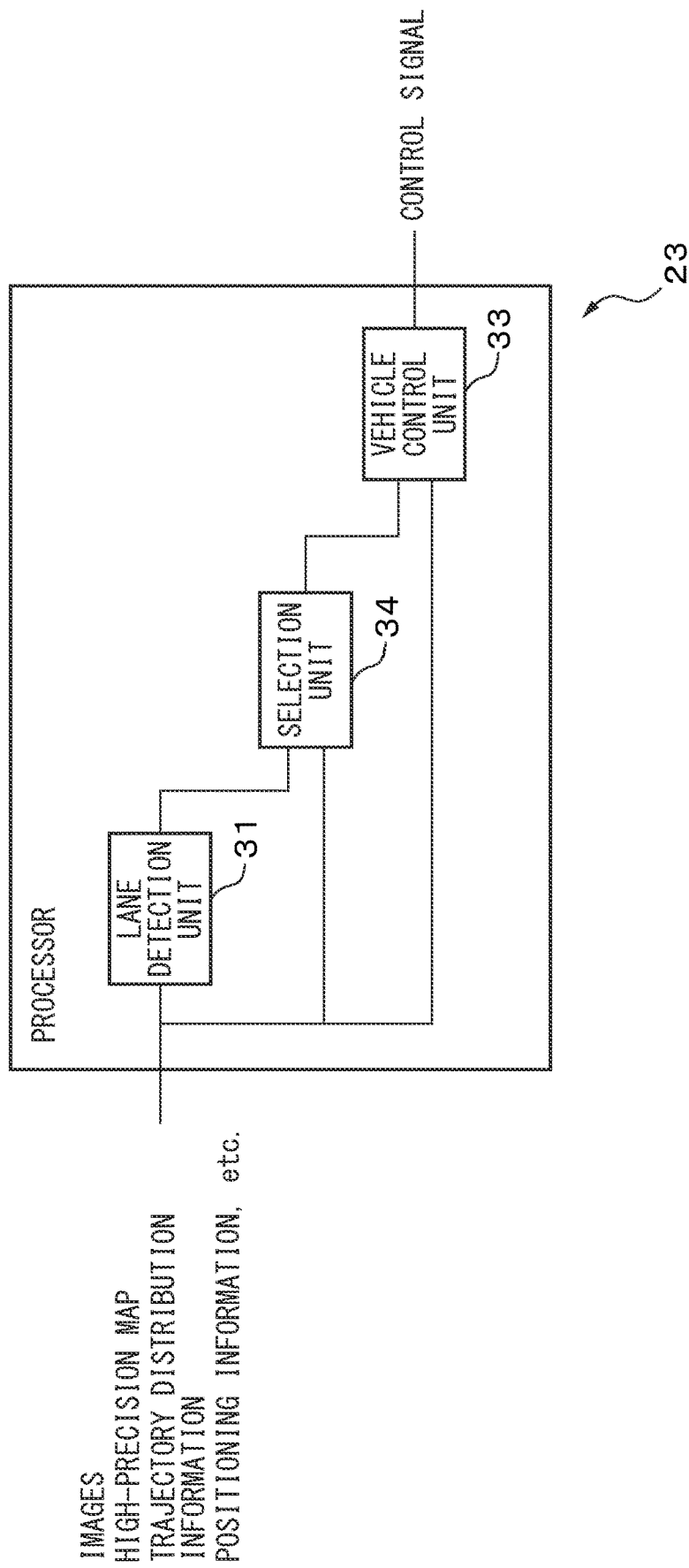
FIG. 6 is a functional block diagram of a processor of the electronic control unit, related to a vehicle control process according to a second embodiment.

FIG. 6 is a functional block diagram of the processor 23, related to the vehicle control process according to the second embodiment. The processor 23 includes a lane detection unit 31, a selection unit 34, and a vehicle control unit 33. These units included in the processor 23 are functional modules, for example, implemented by a computer program executed by the processor 23, or may be dedicated operating circuits provided in the processor 23.

The lane detection unit 31 detects a host vehicle lane being traveled by the vehicle 10, as in the first embodiment. The lane detection unit 31 notifies the detected host vehicle lane to the selection unit 34.

The selection unit 34 identifies a predetermined section lying between the current position of the vehicle 10 and a location that is a predetermined distance away along the travel direction of the vehicle 10 by referring to the high-precision map. The selection unit 34 sets a target trajectory, based on the reference trajectories of lanes in the predetermined section. In the present embodiment, the selection unit 34 selects a lane whose reference trajectory is the safest of the reference trajectories of lanes in the travel direction of the vehicle 10, when the vehicle 10 travels the predetermined section. To this end, the selection unit 34 may determine lanes to which the vehicle 10 can move before reaching the predetermined section as candidate lanes, as in the above-described modified example. Alternatively, when the predetermined section includes an intersection or a divergent point, the selection unit 34 may determine lanes from which the vehicle 10 can head for a destination among multiple lanes in the predetermined section as candidate lanes by referring to a planned travel route of the vehicle 10 received from the navigation device (not illustrated).

For example, the selection unit 34 determines that a lane of the candidate lanes is safer as the amount of deviation of the reference trajectory from the center of the lane is smaller. Alternatively, the selection unit 34 may determine that a lane is safer as the maximum of changes in angle of the travel direction of the reference trajectory of the lane per unit distance is smaller.

When the predetermined section includes an intersection, the lane position of a reference trajectory at the intersection relative to the road edge may be different at an entry into the intersection and an exit therefrom. For example, the reference trajectory of the second lane from the center at an entry into an intersection with three or more lanes in each direction may move to the leftmost lane at an exit from the intersection after a right turn in the intersection. In such a case, a vehicle turning right in the intersection along the reference trajectory of the second lane from the center and another vehicle entering the intersection from the opposite lane and turning left in the intersection may travel on the same lane at an exit from the intersection. However, if the reference trajectory of the centermost lane is kept on the rightmost lane after a right turn, a situation like that described above is assumed to be less likely to occur. Further, if at an intersection having multiple lanes where turning left is permitted, the reference trajectory of one of the lanes moves to a right lane at an exit from the intersection, it is supposed that the vehicle 10 traveling along the one of the lanes needs to move to the right lane after a left turn. However, if the reference trajectory of the rightmost of the lanes where turning left is permitted is kept on the rightmost lane after an exit from the intersection, it is supposed that the vehicle 10 traveling along the rightmost lane need not make a lane change after a left turn. Thus the selection unit 34 determines that a reference trajectory on which the position of a lane including an entry point of the predetermined section is the same as that of a lane including an exit point of the predetermined section is safer than a reference trajectory on which the position of a lane including an entry point of the predetermined section differs from that of a lane including an exit point of the predetermined section. Since this gives priority to a lane whose reference trajectory keeps the lane, the selection unit 34 can select a target lane so as to prevent an accidental lane change.

The selection unit 34 selects a target lane in accordance with one or more of the above-described criteria for lane selection. When multiple selection criteria are used, the selection unit 34 gives the highest priority, for example, to a lane whose reference trajectory keeps the lane in the predetermined section. When there are multiple such lanes, for each of these lanes, the selection unit 34 secondly evaluates the amount of deviation of the reference trajectory from the center of the lane or the maximum of changes in angle of the travel direction per unit distance, and thirdly evaluates the other of the above, thereby selecting a target lane. Alternatively, when priority is given to multiple lanes in accordance with one of the above-described selection criteria, the selection unit 34 may select, of these lanes, the one closest to the host vehicle lane as a target lane.

The selection unit 34 sets the reference trajectory of the target lane determined to be the safest, as a target trajectory in the predetermined section. When the target lane differs from the host vehicle lane, the selection unit 34 further sets a target trajectory in a section from the current position of the vehicle 10 to the predetermined section so that the vehicle 10 moves from the host vehicle lane to the target lane before reaching the predetermined section.

Figure 7:
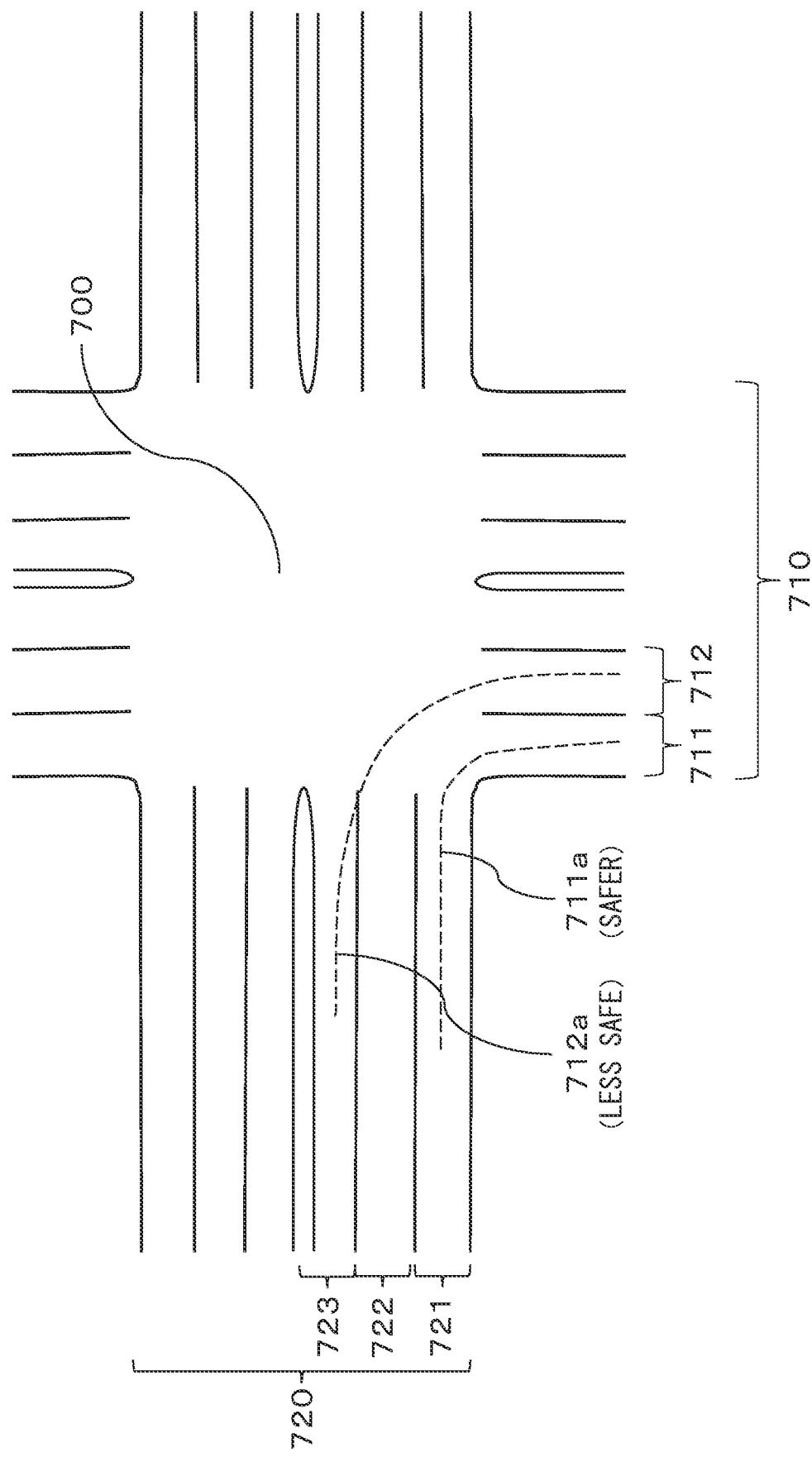
FIG. 7 illustrates an example of safety levels of reference trajectories of lanes.

FIG. 7 illustrates an example of safety levels of reference trajectories of lanes. In the example illustrated in FIG. 7, the predetermined section includes an intersection 700. On two lanes 711 and 712 among lanes included in a road 710 that is one of roads entering the intersection 700, turning left is permitted at the intersection 700. In addition, a road 720 on the left with respect to the road 710 includes three lanes 721, 722, and 723 for exiting from the intersection 700.

A reference trajectory 711a for turning left from the leftmost lane 711 in the road 710 passes along the leftmost lane 721 after an exit from the intersection 700. In other words, the lane position of the reference trajectory 711a relative to the road edge does not change between an entry into the predetermined section and an exit therefrom. By contrast, a reference trajectory 712a for turning left from the second lane 712 from the left in the road 710 passes along the centermost lane 723 in the road 720 after an exit from the intersection 700. In other words, the lane position of the reference trajectory 712a relative to the road edge changes between an entry into the predetermined section and an exit therefrom. Thus the reference trajectory 711a of the lane 711 is determined to be safer than the reference trajectory 712a of the lane 712. Thus, when the vehicle 10 enters the intersection 700 from the road 710 and turns left in the intersection 700, the lane 711 is selected as a target lane.

Upon setting a target trajectory from the current position of the vehicle 10 to the end of the predetermined section, the selection unit 34 notifies the set target trajectory to the vehicle control unit 33.

The vehicle control unit 33 controls components of the vehicle 10 so that the vehicle 10 travels along the target trajectory, similarly to the vehicle control unit 33 according to the first embodiment. When the target lane differs from the host vehicle lane, the vehicle control unit 33 controls components of the vehicle 10 so that the vehicle 10 moves from the host vehicle lane to the target lane along the target trajectory before reaching the predetermined section.

Figure 8:
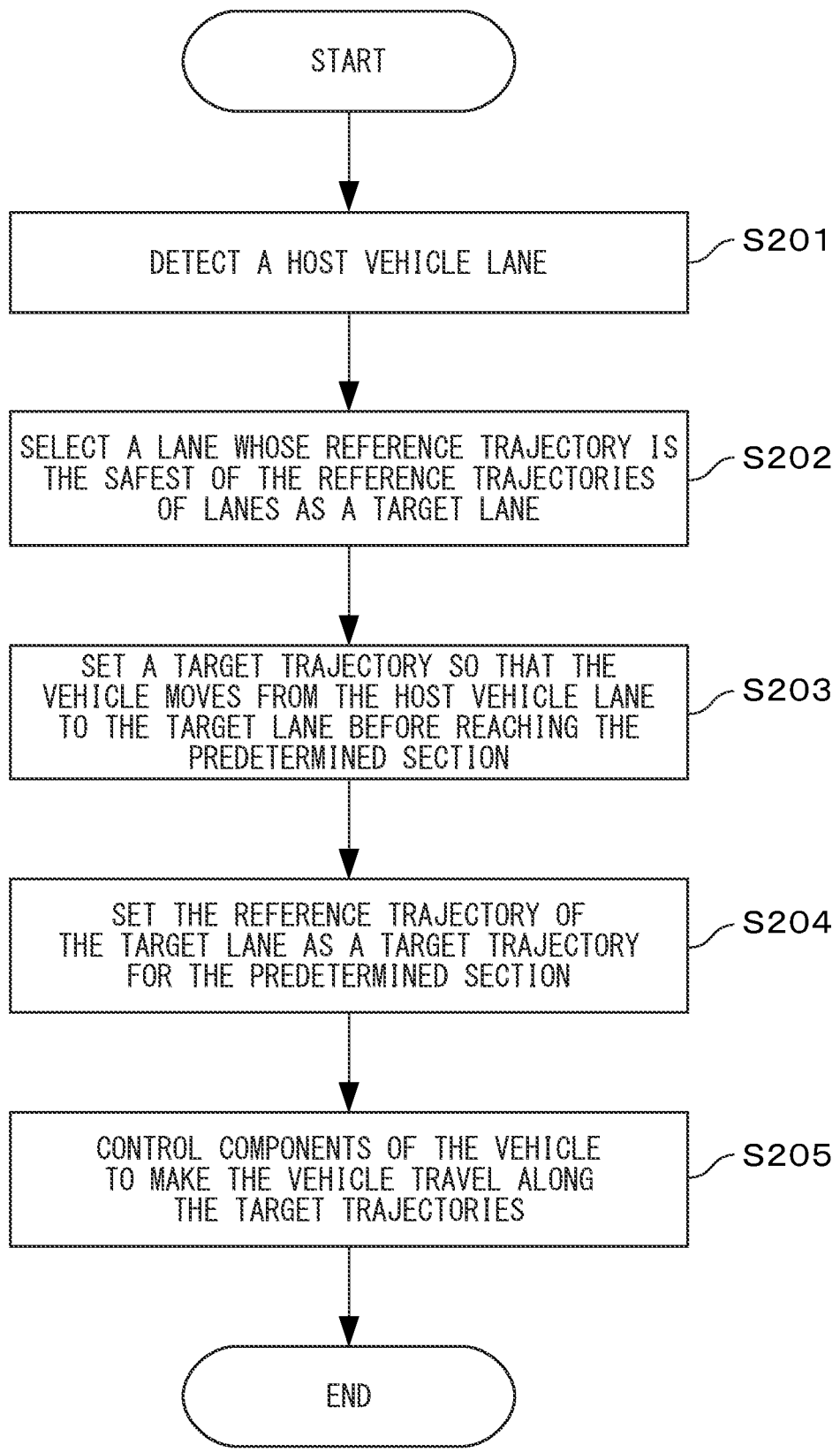
FIG. 8 is an operation flowchart of the vehicle control process according to the second embodiment.

FIG. 8 is an operation flowchart of the vehicle control process according to the second embodiment. The processor 23 executes the vehicle control process at predetermined intervals in accordance with the operation flowchart described below.

The lane detection unit 31 of the processor 23 detects a host vehicle lane being traveled by the vehicle 10 (step S201).

The selection unit 34 of the processor 23 selects a lane whose reference trajectory is the safest of the reference trajectories of lanes in a predetermined section ahead of the vehicle 10, as a target lane (step S202). The selection unit 34 sets a target trajectory so that the vehicle 10 moves from the host vehicle lane to the target lane in a section from the current position of the vehicle 10 to the predetermined section (step S203). For the predetermined section, the selection unit 34 further sets the reference trajectory of the target lane as a target trajectory (step S204).

The vehicle control unit 33 of the processor 23 controls components of the vehicle 10 so that the vehicle 10 travels along the target trajectories (step S205). The processor 23 then terminates the vehicle control process.

As has been described above, the vehicle controller according to the second embodiment selects a lane whose reference trajectory is the safest as a target lane in a predetermined section ahead of the vehicle, by referring to the reference trajectories of respective lanes, and makes the vehicle travel along the reference trajectory of the selected lane. The vehicle controller can therefore guide the host vehicle to a safer lane.

According to a modified example, the vehicle control unit 33 may execute follow-up control to control the vehicle 10 so that the vehicle 10 follows a vehicle traveling ahead of the vehicle 10. In this case, when the predetermined section includes an intersection and the reference trajectory of the host vehicle lane moves to an adjacent lane after a right or left turn in the intersection, a vehicle ahead is likely to move to the adjacent lane after a right or left turn in the intersection. Thus, when follow-up control is applied to the vehicle 10 in the predetermined section including such an intersection, the vehicle control unit 33 may lower the priority of follow-up control. For example, the vehicle control unit 33 may control components of the vehicle 10 so that the vehicle 10 keeps traveling on the host vehicle lane without following a vehicle ahead even if the vehicle ahead moves to the adjacent lane.

Further, the processor 23 may be able to execute both the vehicle control according to the first embodiment and the vehicle control according to the second embodiment. For example, the processor 23 may execute the vehicle control process according to the second embodiment to select a target lane in a predetermined section and to set a target trajectory from the current position of the vehicle 10 to the predetermined section. The processor 23 may then execute the vehicle control process according to the first embodiment to set a target trajectory in the predetermined section.

The computer program for achieving the functions of the processor 23 of the ECU 5 according to the above-described embodiments or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
a memory configured to store trajectory distribution information representing distribution of trajectories for each lane in a predetermined section of a road; and
a processor configured to:
set a target trajectory of a vehicle by referring to the trajectory distribution information of a second lane different from a first lane being traveled by the vehicle, when the vehicle travels the predetermined section, and
make the vehicle travel along the target trajectory.

2. The vehicle controller according to claim 1, wherein the trajectory distribution information includes, for each lane in the predetermined section, a plurality of trajectories of the lane, and
the processor sets the target trajectory away from any of the plurality of trajectories of the second lane included in the trajectory distribution information by at least a predetermined interval.

3. The vehicle controller according to claim 1, wherein the trajectory distribution information includes a reference trajectory and a variation index indicating how much trajectories vary, and
the processor sets the target trajectory farther from the reference trajectory of the second lane as the variation index of the second lane included in the trajectory distribution information is greater.

4. The vehicle controller according to claim 3, wherein the processor identifies a lane having the lowest variation index in the predetermined section by referring to the trajectory distribution information, and sets a target trajectory from a current position of the vehicle to the predetermined section so that the vehicle moves to the identified lane before reaching the predetermined section.

5. A vehicle controller comprising:
a memory configured to store a reference trajectory for each lane in a predetermined section of a road; and
a processor configured to:
select a lane whose reference trajectory is the safest of the reference trajectories of lanes in a travel direction of the vehicle, when the vehicle travels the predetermined section, and
make the vehicle travel along the reference trajectory of the selected lane.

6. The vehicle controller according to claim 5, wherein the processor determines that a reference trajectory whose lane position is the same at an entry into the predetermined section and an exit from the predetermined section is safer than a reference trajectory whose lane position is different at an entry into the predetermined section and an exit from the predetermined section, among the reference trajectories of lanes in a travel direction of the vehicle.

7. The vehicle controller according to claim 5, wherein the processor is further configured to detect a host vehicle lane being traveled by the vehicle, wherein
when the host vehicle lane differs from the selected lane, the processor controls the vehicle so that the vehicle moves to the selected lane before reaching the predetermined section.

8. A method for vehicle control, comprising:
- setting a target trajectory of a vehicle by referring to trajectory distribution information of a second lane different from a first lane being traveled by the vehicle, when the vehicle travels a predetermined section of a road, the trajectory distribution information representing distribution of trajectories for each lane in the predetermined section; and
- making the vehicle travel along the target trajectory.

9. A non-transitory recording medium that stores a computer program for vehicle control, the computer program causing a processor mounted on a vehicle to execute a process comprising:
- setting a target trajectory of the vehicle by referring to trajectory distribution information of a second lane different from a first lane being traveled by the vehicle, when the vehicle travels a predetermined section of a road, the trajectory distribution information representing distribution of trajectories for each lane in the predetermined section; and
- making the vehicle travel along the target trajectory.

\* \* \* \* \*